Feb. 12, 1963    R. E. WEST ETAL    3,077,247
STATIONARY AIRPLANE WHEEL CHOCK
Filed Jan. 31, 1961
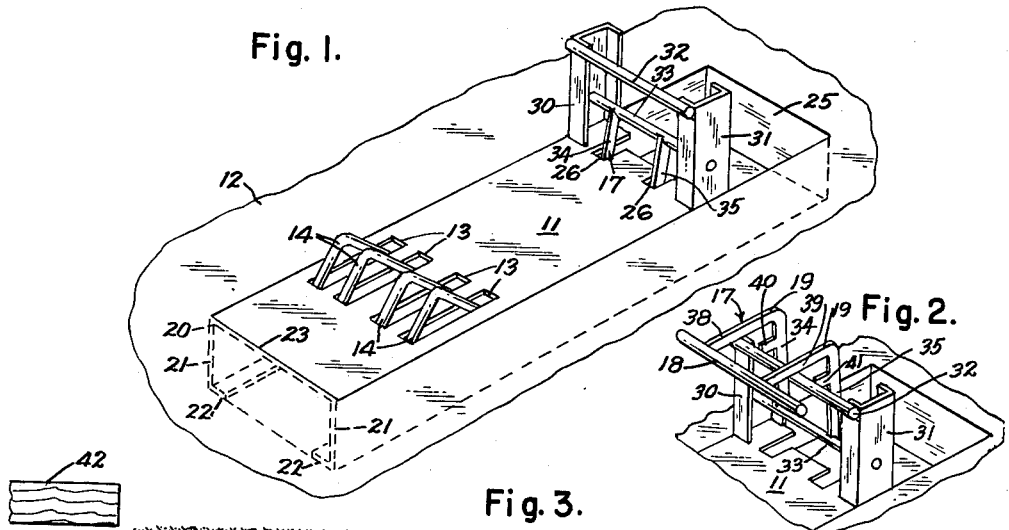
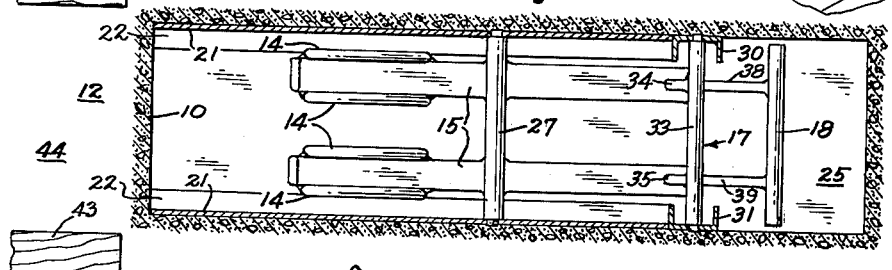
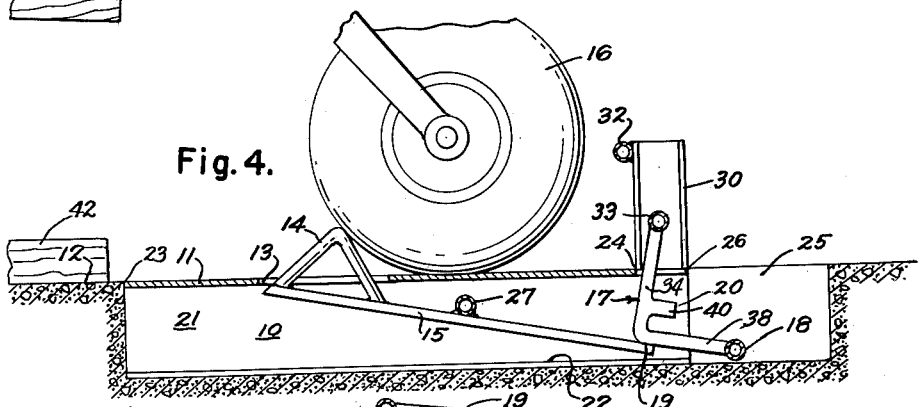
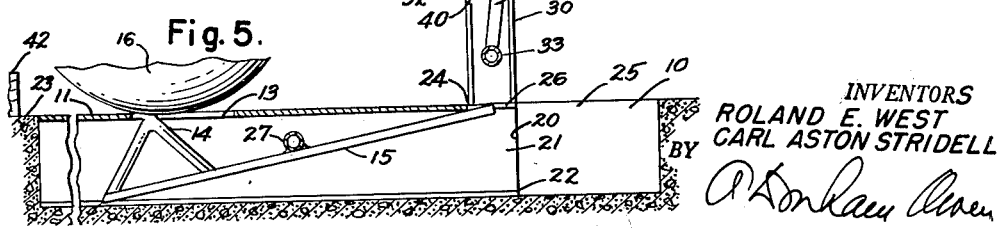
INVENTORS
ROLAND E. WEST
CARL ASTON STRIDELL
BY
ATTORNEY

United States Patent Office 3,077,247
Patented Feb. 12, 1963

3,077,247
STATIONARY AIRPLANE WHEEL CHOCK
Roland E. West and Carl Aston Stridell, Santa Cruz, Calif., assignors to Coast Engineer & Supply Co., Soquel, Calif., a corporation of California
Filed Jan. 31, 1961, Ser. No. 86,176
5 Claims. (Cl. 188—111)

This invention relates to a stationary chock or ground-supported device for holding the wheel of an airplane or the like, so as to keep the airplane in place in its hangar or elsewhere.

There has heretofore been no really adequate means of securing the wheels of airplanes in place when the airplanes have been brought into their hangars. Up to now, the practice has been to place a wooden block or chock back of the wheel, a primitive expedient which somehow has continued in use, at least for light planes. These chocks have to be inserted and removed by hand or foot by somebody outside the airplane.

An object of this invention is to provide a chock which is automatically actuated by the airplane wheel itself and which, when actuated, holds the wheel within a narrow range of fore-and-aft movement. This new chock is fixed to the hangar floor and it may be readily released by hand, either by the pilot or by another person, prior to moving the airplane out of the hangar.

Other objects and advantages of the invention will appear from the following description of a preferred embodiment.

In the drawings:

FIG. 1 is a view in perspective of a chock embodying the invention installed in the floor of a hangar, most of the floor being broken away to conserve space. The device is here shown in its locked position.

FIG. 2 is a fragmentary view of a forward portion of FIG. 1, showing the device in its unlocked position.

FIG. 3 is a top plan view partly in section of the wheel-locking device in its locked position, with the floor plate removed.

FIG. 4 is a view in side elevation and in section of the device in its locked position with a wheel held in place.

FIG. 5 is a view similar to FIG. 4 showing the device in its unlocked position and with the chock arms depressed by an airplane wheel.

Basically, the chock or wheel-locking device of this invention comprises a sunken receptacle 10 covered by a plate 11 that is generally on the same plane as the floor 12. Through perforations 13 in the plate 11 project a series of chock arms 14 that are mounted on pivoted bars 15. The bars 15 are so weighted that the chock arms 14 normally extend up above the level of the floor 12, but the bars 15 are so slightly off balance that an airplane wheel 16 or similar device can easily depress the chock arms 14 and roll over them. A pivoted L-shaped crank assembly 17 is provided at one end of the receptacle 10; and after the airplane wheel 16 passes over the chock arms 14, it engages an outer bar 18 of the crank assembly 17 and pushes the crank assembly 17 over. It swings approximately 90°, and its vertices 19 then lock the bars 15 down, thereby holding the chock arms 14 locked in their elevated position so that the wheel 16 cannot roll back over them. The arms 14 therefore keep the wheel 16 in place until the crank assembly 17 is lifted up to its original position.

Now the device will be described in more detail. The hangar floor 12 is provided with a suitable recess for the receptacle 10. The plate 11 may be the top of a channel-like beam 20 having sides 21 and inturned bottom edges 22. Usually, the floor 12 and the plate 11 are sloped slightly toward the end 23 from which the wheel 16 enters, or else they are prefectly level. In the drawings the slope is slightly exaggerated. At the opposite end 24 of the plate 11, the receptacle 10 continues on, forming an uncovered well 25. A series of rectangular holes or perforations 13 is provided, as by cutting them through the top plate 11, and the end 25 may have a pair of cut-out recesses 26 to enable the crank assembly 17 to move to its locked position.

Below the plate 11 and journaled in the sides 21 is a pivot member 27 on which are carried two parallel bars 15. The chock arms 14 may be rods bent at an acute angle and welded at each end to the bars 15, to provide upwardly extending inverted V-shaped chocks 14. The bars 15 are counterweighted, as by making the chock end substantially shorter or by weighting the opposite end.

Adjacent the end 24 of the plate 11 is an upwardly extending frame which may comprise a pair of channel members 30 and 31, one on each side of the plate 11, having near their upper ends a cross rod 32 welded to the edges that face the chocks 14, so that the cross bar 32 is ahead of center. The crank assembly 17 includes a pivot rod 33 that is centered in the frame members 30 and 31 and journaled in them. From it extend two radial arms 34 and 35 of such length that, when the crank 17 is in locked position (see FIGS. 3 and 4), the vertices or outer ends 19 of the arms 34 and 35 engage the counterweighted ends of the swinging bars 15 and prevent them from moving up, thereby holding the chock arms 14 up above floor level 12. From the outer ends 19 of the arms 34 and 35 a pair of tangential arms 38, 39 extend perpendicularly. These arms 38, 39 support the bar 18 at their outer end. The arms 38, 39 may also have a pair of projections 40, 41 adapted to engage the stationary cross rod 32 when in upper position. By this means the crank 17 is supported with the tangential arms 38, 39 sloping downwardly from the bar 18 to the ends 19. Therefore, when an airplane wheel 16 engages the bar 18, the crank 17 will automatically be pushed over into the locking position.

For use with an airplane of the type having a tricycle landing gear, the device may be used only for the front wheel 16; in two-wheel aircraft there may be one of these devices for each wheel. Preferably a channel or track is provided in front of the device to help guide the wheel 16 into place. This track may comprise a pair of four-by-fours 42, 43 bolted to the floor 12 one on each side, leaving a channel or wheel track 44 between them.

In operation, when the airplane is moved forward with a wheel 16 in the track 44, the wheel engages the chock arms 14 and depresses the bars 15 (see FIG. 5), but when the wheel 16 has passed over them, the chock arms 14 resume their original upper position, there being sufficient distance between them and the bar 18 to insure that the arms 14 will move up before the locking crank 17 is pushed over. When the wheel 16 engages the bar 18 of the locking crank 17 and pushes the crank over its center of gravity, it falls down into well 25. As it does so, the ends 19 of the radial arms 34, 35 engage the counterweighted ends of the bars 15 and hold them down. As the wheel 16 rolls back, because of the backward slope, or is pushed slightly if the floor is perfectly level, it cannot go beyond the extending chock arms 14.

When it is desired to take the airplane out of the hangar, the device is released by lifting the crank 17 up to its upper position, i.e., back to its original position. Enough room is left between the bar 18 and the chock arms 14 so that the wheel 16 will not interfere. Then the airplane can be moved backward, either rolled by hand, permitted to roll if there is enough slope, or moved by power if desired. This leaves the wheel-locking device in its ready position so that when the airplane returns to the hangar, it will again be automatically actuated.

Thus, the device is always ready for use unless actually physically tampered with.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An airplane wheel chock for installation in hangar floors and the like, comprising a sunken receptacle having a cover over a portion thereof, said cover having openings therethrough, and a well portion extending from and lying beyond one end of said cover;

a plurality of bars having means for pivotally mounting them inside said receptacle and each having one end with upwardly extending chock arms forming generally inverted V-shaped projections, and a second end, and having means for normally urging said second end down and said chock arms up through said cover openings and above floor level;

a stationary frame adjacent said well having an elevated stop means; and a crank having a generally radial portion with means on one end for pivotally mounting said crank to said frame and having a portion on the other end of said radial portion perpendicular thereto, said crank being pivotally movable between an inoperative position and an operative position holding said second ends of said bars in their depressed positions and having actuating portions engageable by an airplane wheel for causing said crank to move on its pivotal mounting into its operative position, and also having stop portions to engage said stop means in said inoperative position.

2. A wheel-locking device comprising a plate at floor level having perforations therethrough;

a sunken receptacle below said plate having a well portion extending from one end of the plate and therebeyond;

chock means having means for pivoting it below the plate and having at one end upwardly extending inverted V-shaped projections, the other end being counterweighted so as to normally urge said projections to extend up through the perforations in the plate and above floor level;

frame means adjacent one end of said plate having stop members therein; and a rigid crank having means for pivoting it to said frame means and having radial portions whose length is approximately the distance between the crank pivot and the counterweighted end of said bars when said ends are in their depressed positions and having portions extending out from the outer ends of said radial portions with an actuating cross member extending across their outer ends and stop members on said crank for engaging said frame stop members in a position to be actuated, so that when said crank is in said actuation position, a wheel can drive upon said projections, depressing said chock means, then releasing them, so that the counterweighted ends return to their lower position and the projections return to their upper position, then strike said cross member to knock said crank down to lock said chock means in their locked positions and prevent the wheel from rolling back over said projections.

3. A wheel-locking device comprising a plate at floor level having perforations therethrough;

a sunken receptacle below said plate having a well portion lying beyond one end of the plate;

a plurality of identical bars having means for pivoting it below the plate each having at one end upwardly extending inverted V-shaped projections, the other end being counterweighted so as to normally urge said projections to their elevated position where they extend up through the perforations in the plate and above floor level;

a stationary vertical frame at one end of said plate having an elevated crossbar generally parallel to the floor; and a rigid L-shaped crank having means for pivoting it to said frame and having radial portions whose length is approximately the distance between the crank pivot and the counterweighted end of said bars when said ends are in their depressed positions and having tangential portions extending out perpendicularly from the outer ends of said radial portions, and a cross member extending across said tangential portions at their outer ends, said radial portions also having stop members thereon, whereby when said crank is placed with its above said plate and said stop members rest on said crossbar, a wheel can drive upon said projections, depressing said bars, then releasing them, so that the counterweighted ends return to their lower position and the projections return to their upper position, then strike said cross member to knock said crank down to lock said parallel bars with projections up to prevent the wheel from rolling back over said projections.

4. An airplane wheel chock for installation in a hangar floor and the like, comprising a sunken receptacle below said floor having a cover with openings therethrough and a well portion extending out from one end of said cover, a plurality of bars with first and second ends, means for pivotally mounting said bars inside said receptacle with said first ends being the ends closer to said well portion, generally V-shaped chock arms secured to said bars adjacent said second ends and extending upwardly therefrom, means for normally urging said first ends down to the bottom of said receptacle and said second ends up so that said chock arms extend through said openings and above floor level, a stationary frame adjacent the boundary between said cover and said well having an elevated horizontal crossbar, a rigid L-shaped crank having as one arm of the L radial portions and having as the other arm of the L portions each extending out generally tangentially from one end of the radial portions, means for pivotally mounting said crank, adjacent the other end of said radial portions, to said frame, and for enabling pivotal movement of said crank between an inoperative position out of said well and an operative position largely in said well, the length of said radial portions from said means for pivotally mounting said crank being approximately the distance from said means for pivotally mounting said crank to said first ends, said crank in said operative position engaging said first ends to hold them down and to hold said chock arms up above floor level, bar means extending across and secured to the outer ends of said tangential portions, and stop portions on said crank radial portions for engaging said crossbar when said crank is in said inoperative position.

5. An airplane wheel chock for installation in hangar floors and the like, comprising a sunken receptacle having a cover over a portion thereof, said cover having openings therethrough, and a well portion extending from and lying beyond one end of said cover, bar means having an upward chock end formed with projections thereon and a second end, means for pivotally mounting said bar means inside said receptacle, means for normally urging said second end down and said chock end up with its projections extending up through said cover openings and above floor level, a stationary frame adjacent said well having elevated stop means, and bar means locking means having means for mounting it on said frame for pivotal movement between an inoperative position and an operative position holding said second end of said bar means down, said bar means locking means having a portion engageable by an airplane wheel when said bar means locking means is in its inoperative position so that when a wheel engages that said portion said bar means locking means moves to its operative position, said bar means locking means also having a stop portion to engage said stop means and retain said bar means locking means in its inoperative position where engagement by said wheel is possible.

References Cited in the file of this patent

UNITED STATES PATENTS

| | | |
|---|---|---|
| 1,922,554 | McCosh | Aug. 15, 1933 |
| 1,943,003 | Cochin | Jan. 9, 1934 |
| 2,577,330 | Johnston | Dec. 4, 1951 |
| 2,661,817 | Mullins | Dec. 8, 1953 |

FOREIGN PATENTS

| | | |
|---|---|---|
| 810,593 | Great Britain | Mar. 18, 1959 |